Nov. 11, 1958 A. M. BEST 2,859,862
HAY DISTRIBUTOR
Filed Feb. 9, 1956 3 Sheets-Sheet 1

INVENTOR
ALBERT M. BEST
Joseph Allen Brown
ATTORNEY

Nov. 11, 1958   A. M. BEST   2,859,862
HAY DISTRIBUTOR
Filed Feb. 9, 1956   3 Sheets—Sheet 2

INVENTOR
ALBERT M. BEST
Joseph Allen Brown
ATTORNEY

Nov. 11, 1958 — A. M. BEST — 2,859,862
HAY DISTRIBUTOR
Filed Feb. 9, 1956 — 3 Sheets-Sheet 3
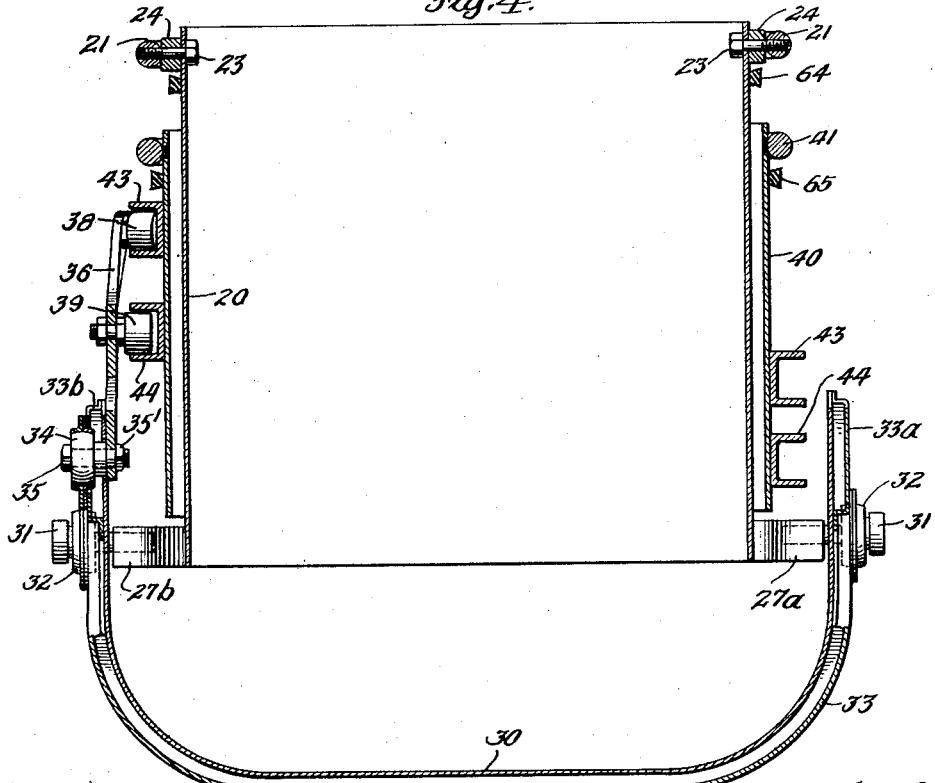
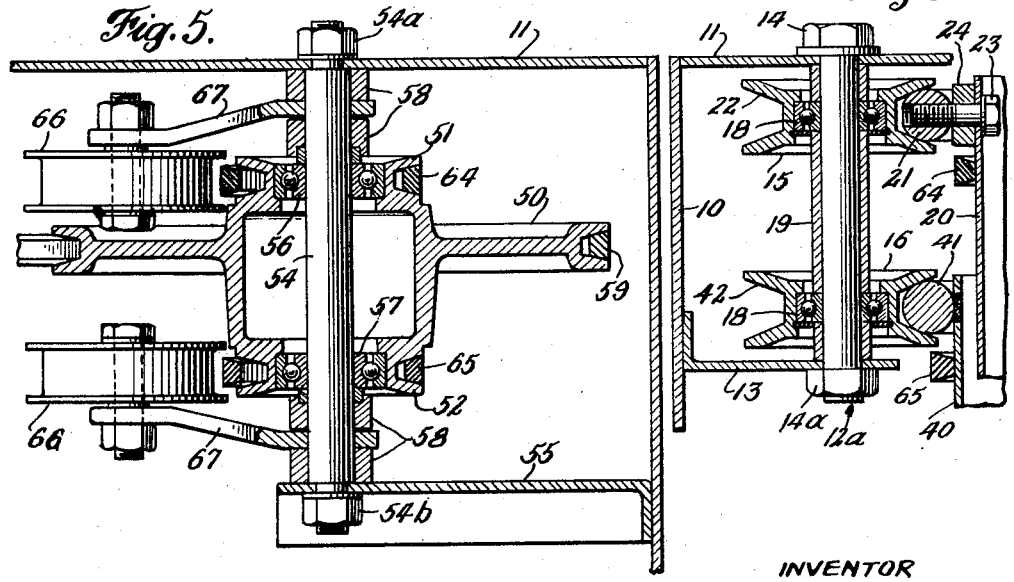
INVENTOR
ALBERT M. BEST
Joseph Allen Brown
ATTORNEY United States Patent Office 2,859,862
Patented Nov. 11, 1958

2,859,862
HAY DISTRIBUTOR

Albert M. Best, New Holland, Pa., assignor to Sperry Rand Corporation, New Holland, Pa., a corporation of Delaware Application February 9, 1956, Serial No. 564,406

6 Claims. (Cl. 198—128)

The present invention relates generally to devices for spreading bulk, fibrous material. More particularly, the invention relates to an improved device for evenly distributing chopped hay or the like over a mow drying system.

When chopped hay is delivered into a mow drying system and forked around by hand in order to evenly distribute it over the mow floor, the hay is tramped down by the person or persons working it. Thereafter, when the drier is put in operation, the drying air follows courses of least resistance and travels through the areas of hay which have not been tramped down, or tramped down the least, while not passing through the other areas. Therefore, some areas are throughly dried, but other areas are left wholly or partially undried. This produces mold pockets which are undesirable.

Various devices have been invented to mechanically distribute chopped hay. While these devices are advantageous in that they save labor costs in hay distributing, they generally do not distribute or spread the hay as uniformly as can be accomplished by hand. This results, in part, because the devices are unable to adequately compensate for the intermittent flow of hay into the distributor.

The primary object of this invention is to provide a distributor device which will spread chopped hay, or the like, more evenly than devices heretofore available.

Another object of this invention is to provide a distributor device which will uniformly spread hay even though the rate of flow of hay into the distributor is intermittent.

Another object of this invention is to provide an improved distributor device having a deflector which is constantly rapidly rotated and simultaneously oscillated when the device is used.

Another object of this invention is to provide a distributing device in which a deflector is rotated at a constant speed regardless of the rate of flow of material through the device.

A further object of this invention is to provide, in a device of the character described, a deflector which oscillates at a constant frequency and amplitude.

A still further object of this invention is to provide a distributor device of relatively simple construction thereby enabling the manufacture of the device at low cost.

Other objects of this invention will be apparent hereinafter from the specification and from the recital in the appended claims.

Figure 1:
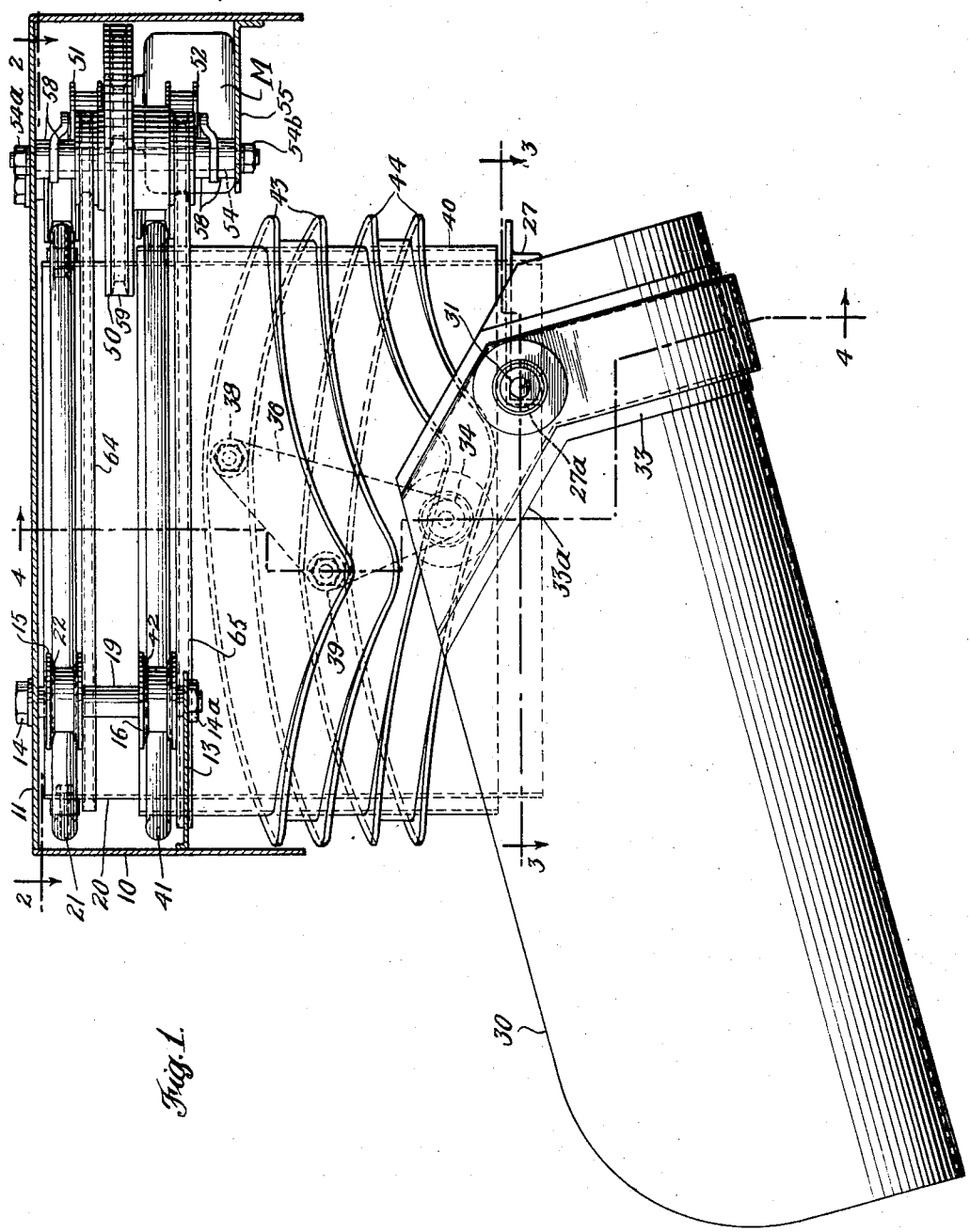
Fig. 1 is a part side elevation, part section, of a distributor device constructed according to one embodiment of this invention, and taken on the line 1—1 of Fig. 2 looking in the direction of the arrows.
Figure 2:
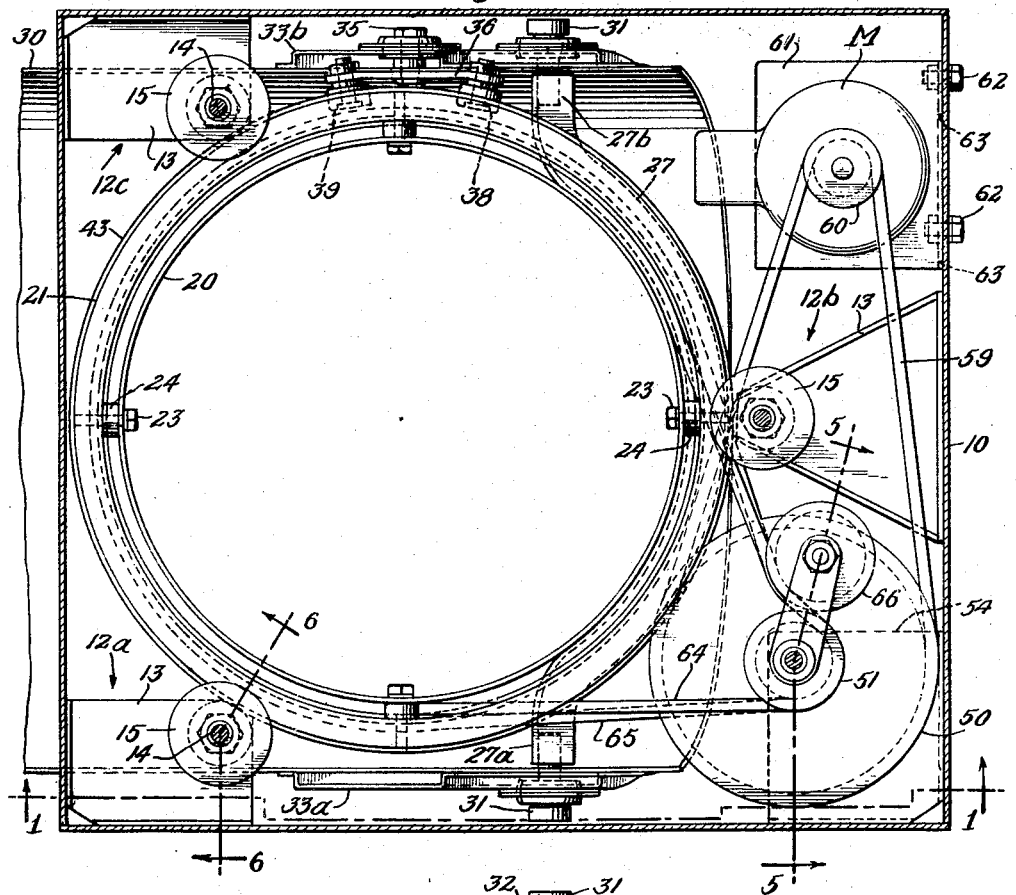
Fig. 2 is a section taken on the line 2—2 of Fig. 1 looking in the direction of the arrows and showing a fragmentary portion of the deflector of the device.

Fig. 4 is a section taken on the line 4—4 of Fig. 1 looking in the direction of the arrows and illustrating in particular the cam track means for oscillating the deflector of the distributor; and Figs. 5 and 6 are sections taken on the lines 5—5 and 6—6, respectively, of Fig. 2 and looking in the direction of the arrows.

Referring now to the drawings by numeral of reference, and particularly, to Fig. 1, the distributor illustrated is adapted to be mounted from suitable supporting structure which, for purposes of clarity, has not been shown. The distributor has a generally rectangular housing 10 at its upper end which includes a top wall 11 formed with an inlet opening, not shown, for the admission of chopped hay. Housing 10 is provided with three hangers 12a, 12b, and 12c (Fig. 2), at spaced points thereon, each of which is constructed substantially as shown in Fig. 6.

Each hanger comprises a bracket 13, welded or otherwise affixed to housing 10, and extending parallel to top wall 11. Extending downwardly through top wall 11 and then through bracket 13 is a bolt 14 having a nut 14a threaded on its lower end. Rotatably mounted on the shank of bolt 14 are spaced pulleys 15 and 16, each of which includes a bearing 18. Surrounding bolt 14 are tubular segments 19 which engage the inner races of the bearings and prevent axial movement of the pulleys on the bolt.

Upper pulleys 15, on each of the three hangers, cooperate to rotatably support a distributor sleeve 20 (Figs. 2, 4, and 6). Sleeve 20 has a ring 21 around its upper end which fits into the grooved rim 22 of each upper pulley. Ring 21 is circular in cross section; and, its diameter is such that it fits snugly in each grooved rim 22. Ring 21 is rigidly connected to sleeve 20 by bolts 23 which extend through the sleeve and through spacer-blocks 24.

Figure 3:
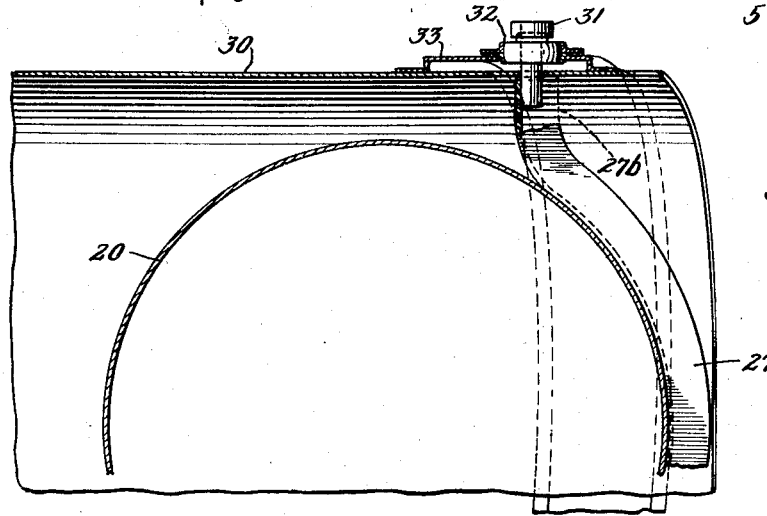
Fig. 3 is a fragmentary section taken on the line 3—3 of Fig. 1 and looking in the direction of the arrows.

The lower end of distributor sleeve 20 has a bracket 27 (Figs. 2 and 3) affixed to it. Bracket 27 surrounds a portion of the sleeve and has outwardly projecting ends 27a and 27b. The bracket supports a scoop-shaped deflector or spout 30 which is connected to the ends 27a and 27b, respectively, by pivot pins 31. Pins 31 extend through bearings 32 carried on a strap 33 which is affixed to and encircles deflector 30 adjacent one end thereof.

Lower pulleys 16, on each of the three hangers 12a, 12b, and 12c, cooperate to support a tubular cam carrier or sleeve 40 (Figs. 4 and 6) which surrounds distributor sleeve 20 for a portion of its length. Cam carrier 40 has a ring 41 welded around its upper end which fits into the grooved rim 42 of each lower pulley 16. As with ring 21 on sleeve 20, ring 41 is circular in cross section and of a diameter to properly fit into the grooved rim 42 of each lower pulley. Rings 21 and 41 are of equal diameter; and, as shown in Fig. 4, the spacer blocks 24 compensate for the difference between the diameter of distributor sleeve 20 and cam carrier 40.

Carrier 40 has a pair of cam tracks 43 and 44 affixed to its periphery, each of which is U-shaped in cross-section (Fig. 4).

Strap 33 on deflector spout 30 has angular portions 33a and 33b (Figs. 1, 2 and 4). Portion 33b has a bearing 34 through which a pivot pin 35, threaded on its inner end, projects. Pin 35 is connected to a rocker arm 36 by means of a nut 35' threaded on the pin. Rocker arm 36 carries a pair of cam followers 38 and 39 which ride in cam tracks 43 and 44, respectively.

Rotatably mounted in housing 10 is a drive pulley 50 (Figs. 2 and 5) which has an upper pulley element 51 and a lower pulley element 52. Pulley 50 is rotatable on a vertically extending shaft 54 connected at its upper end to top wall 11 by nut 54a and connected at its lower end to a support bracket 55 by means of a nut 54b. Bracket 55 is welded to the housing 10. Axially spaced bearings 56 and 57 are interposed between the pulley and shaft 54. Ring segments 58 hold pulley 50 against axial movement on the shaft.

Pulley 50 is connected by an endless belt 59 to the pulley 60 of a motor M (Fig. 2) mounted on a support bracket 61 connected to housing 10 by bolts 62. Bracket 61 is provided with slots 63 through which bolts 62 pass so that the bracket, and the motor M supported thereon, can be adjusted toward or away from pulley 50 to thereby adjust the tightness of endless belt 59.

Upper pulley element 51 of pulley 50 is connected to distributor sleeve 20 by an endless belt 64 (Figs. 1 and 2). Lower pulley element 52 is connected to tubular cam carrier 40 by an endless belt 65. Endless belts 64 and 65 are maintained in a tight embrace about sleeve 20 and carrier 40, respectively, by conventional, spring loaded, belt tightening wheels 66 (Figs. 2 and 5) carried on arms 67 extending radially from the shaft 54 on which pulley 50 is mounted.

From the above, it will be seen that when motor M is in operation, pulley 50 is rotatably driven through endless belt 59. Pulley elements 51 and 52 carried on pulley 50 rotate distributor sleeve 20 and cam carrier 40, respectively, through endless belts 64 and 65, respectively. Sleeve 20 and carrier 40 rotate in the same direction. However, since the diameter of sleeve 20 is less than the diameter of carrier 40, it is rotated at a slightly greater speed than the carrier. For example, sleeve 20 may rotate at 75 R. P. M. while carrier 40 rotates at 73 R. P. M., or a difference of 2 R. P. M. This rotation of the sleeve relative to the cam carrier is utilized to oscillate deflector 30.

Deflector 30, rocker arm 36 and cam followers 38 and 39 rotate with sleeve 20. As a result, the cam followers 38 and 39 are caused to roll over the slower moving cam tracks 43 and 44 on the cam carrier. The cam tracks and cam follower cooperate to rock rocker arm 36. This rocking motion is imparted to deflector 30 through the pivotal connection between the rocker arm and the deflector by pin 34. Deflector 30 is oscillated upwardly and downwardly about pivot pins 31 at a constant frequency and amplitude.

When chopped hay or the like is fed through the opening in top wall 11 and into sleeve 20, the hay drops by gravity through the rotating sleeve and down onto the rotating and oscillating deflector. The rapid spinning of the deflector throws the hay outwardly and downwardly. The oscillations of the deflector discharge the hay in such a manner that it is spread evenly as it falls and a uniform coverage of material is obtained on the receiving surface such as a mow floor.

Although the rate of flow of chopped hay fed into the distributor may vary greatly, nevertheless, an even spreading of the hay will result, due to the rapid rotation of deflector 30 and its constant oscillation.

While the invention has been described in connection with a particular embodiment thereof, it will be understood that it is capable of further modification and that it may be used other than in connection with a mow drying system. The distributor could be used, for example, in a silo to distribute ensilage as it is delivered into the silo from a usual ensilage cutter and elevator. This application is intended to cover any variations, uses or adaptations of the invention, following, in general, the principles of the invention and including such departures from the present disclosure as come within known or customary practice in the art to which the invention pertains, and as fall within the scope of the invention or the limits of the appended claims.

Having thus described my invention, what I claim is:

1. A device for distributing chopped hay or the like, comprising an inner sleeve, an outer sleeve surrounding said inner sleeve, means supporting said sleeves for rotation about a common generally vertical axis, a deflector pivotally connected to said inner sleeve, a cam track carried on said outer sleeve, a cam follower connected to said deflector, said cam follower engaging said cam track, means for rotating said inner sleeve and said deflector in one direction and at one speed, and means for rotating said outer sleeve in the same direction and at a different speed whereby there is a relative rotary movement between said inner and outer sleeves and said cam follower moves over said cam track, said cam track and cam follower being cooperative to oscillate said deflector at a constant frequency and amplitude as it rotates.

2. A device for distributing chopped hay or the like, comprising a vertically extending inner sleeve having an inlet upper end and an outlet lower end, a concentric outer sleeve surrounding said inner sleeve for a portion of its length, means supporting said sleeves for rotation about a common generally vertical axis, a deflector pivotally connected to said lower end of said inner sleeve and extending diagonally to said axis, a pair of cam tracks carried on the periphery of said outer sleeve, a rocker arm connected to said deflector, a pair of cam followers carried on said rocker arm, each of said cam followers engaging, respectively, one cam track of said pair of cam tracks, means for rotating said inner sleeve and said deflector in one direction and at one speed, and means for rotating said outer sleeves and said cam track in the same direction, but at a different speed, whereby there is a relative movement between said inner and outer sleeves and said cam followers roll over said cam tracks, said cam tracks and cam followers being cooperative to rock said rocker arm to impart an oscillating movement to said deflector as it rotates.

3. A device for distributing chopped hay or the like, comprising a vertically extending inner sleeve having an inlet end and an outlet end, a concentric outer sleeve surrounding said inner sleeve for a portion of its length, a first ring fastened to the periphery of said inner sleeve, a second ring fastened to the periphery of said outer sleeve, a plurality of hangers spaced angularly about said sleeves to rotatably support said sleeves, each of said hangers comprising a first pulley in engagement with said first ring and a coaxial second pulley in engagement with said second ring, a deflector pivotally connected to said inner sleeve adjacent said outlet end and extending diagonally to the axis of said inner sleeve, a cam track carried on said outer sleeve, a cam follower connected to said deflector, said cam follower engaging said cam track, means for rotating said inner sleeve and said deflector in one direction and at one speed, and means for rotating said outer sleeve and said cam track in the same direction and at a different speed, whereby there is a relative rotary movement between said inner and outer sleeves and said cam follower moves over said cam track, said cam follower and cam track being cooperative to oscillate said deflector as it rotates.

4. A device for distributing chopped hay or the like, comprising a vertically extending inner sleeve having an inlet end and an outlet end, a concentric outer sleeve surrounding said inner sleeve for a portion of its length, a first ring fastened to the periphery of said inner sleeve, a second ring fastened to the periphery of said outer sleeve, a plurality of hangers spaced angularly about said sleeves to rotatably support said sleeves, each of said hangers comprising a first pulley in engagement with said first ring and a coaxial second pulley in engagement with said second ring, a deflector pivotally connected to said inner sleeve adjacent said outlet end and extending diagonally to the axis of said inner sleeve, a cam track carried on said outer sleeve, a cam follower connected to said deflector, said cam follower engaging said cam track, means for rotating said inner and outer sleeves in the same direction comprising a drive pulley, a motor for rotating said drive pulley, a pair of pulley elements, one on each side of said drive pulley, an endless belt connecting one pulley element to said inner sleeve, and an endless belt connecting the other pulley element to said outer sleeve, said inner sleeve being rotated at a speed faster than the speed of rotation of said outer sleeve whereby said cam follower moves over said cam track, said cam track and cam follower being cooperative to oscillate said deflector as it rotates.

5. A device for spreading chopped hay or the like, comprising a tubular distributor, means mounting said distributor for rotation on a fixed generally vertical axis, said distributor having an upper inlet end and a lower outlet end, a cam track, means mounting said cam track for rotation about said vertical axis, a deflector pivotally connected to said distributor adjacent said outlet end, a cam follower connected to said deflector and engaging said cam track, and means for simultaneously rotating said distributor and deflector and said cam track in the same direction and at different speeds to produce a relative movement between said distributor and deflector in relation to said cam track whereby the cam follower moves over said cam track, said cam track and cam follower being cooperative to oscillate said deflector as it rotates.

6. A device for distributing chopped hay or the like, comprising an inner sleeve, an outer sleeve surrounding said inner sleeve, means vertically supporting said sleeves on a common generally vertical axis, a deflector extending beneath said sleeves and diagonal to said axis, means pivotally connecting said deflector to one of said sleeves, a cam track on the other of said sleeves, a cam follower connected to said deflector and engaging said cam track, means for rotating both of said sleeves in the same direction and at different speeds to produce a relative movement between the sleeves whereby said follower moves over said track, said cam track and cam follower being cooperative to oscillate said deflector at a constant frequency and amplitude as it rotates.

References Cited in the file of this patent

UNITED STATES PATENTS

| | | |
|---|---|---|
| 1,317,365 | Greenberg | Sept. 30, 1919 |
| 1,436,508 | Lane et al. | Nov. 21, 1922 |
| 2,215,736 | Jones | Sept. 24, 1940 |
| 2,753,056 | Eastman et al. | July 3, 1956 |